US009698651B2

(12) United States Patent
De Wergifosse et al.

(10) Patent No.: US 9,698,651 B2
(45) Date of Patent: Jul. 4, 2017

(54) ELECTRICAL POWER SUPPLY SYSTEM COMPRISING AN ASYNCHRONOUS MACHINE, AND AN ENGINE FITTED WITH SUCH AN ELECTRICAL POWER SUPPLY SYSTEM

(71) Applicant: LABINAL POWER SYSTEMS, Blagnac (FR)

(72) Inventors: Eric De Wergifosse, Saint Augustin (FR); Cedric Duval, Samois sur Seine (FR)

(73) Assignee: LABINAL POWER SYSTEMS, Blagnac (FR)

( * ) Notice: Subject to any disclaimer, the term of this patent is extended or adjusted under 35 U.S.C. 154(b) by 105 days.

(21) Appl. No.: 14/402,794

(22) PCT Filed: May 14, 2013

(86) PCT No.: PCT/FR2013/051050
§ 371 (c)(1),
(2) Date: Nov. 21, 2014

(87) PCT Pub. No.: WO2013/175098
PCT Pub. Date: Nov. 28, 2013

(65) Prior Publication Data
US 2015/0108760 A1     Apr. 23, 2015

(30) Foreign Application Priority Data

May 21, 2012    (FR) .................................... 12 54612

(51) Int. Cl.
*H02K 7/18*         (2006.01)
*F01D 15/10*        (2006.01)
(Continued)

(52) U.S. Cl.
CPC ........... *H02K 7/1823* (2013.01); *B64D 15/12* (2013.01); *F01D 7/00* (2013.01); *F01D 15/10* (2013.01);
(Continued)

(58) Field of Classification Search
CPC ....... H07K 7/1823; F01D 15/10; F01D 25/02; F01D 7/00; B64D 15/12; H02K 16/02; H02K 17/42; H02K 11/0094
See application file for complete search history.

(56) References Cited

U.S. PATENT DOCUMENTS 4,927,329 A * 5/1990 Kliman ................... F01D 7/00
                                                         416/127
5,694,026 A * 12/1997 Blanchet ................ F01D 15/10
                                                         290/27
(Continued)

FOREIGN PATENT DOCUMENTS

EP        2 390 183        11/2011
WO        99 04403         1/1999
(Continued)

OTHER PUBLICATIONS

International Search Report Issued Jul. 3, 2013 in PCT/FR13/051050 Filed May 14, 2013.

*Primary Examiner* — Viet Nguyen
(74) *Attorney, Agent, or Firm* — Oblon, McClelland, Maier & Neustadt, L.L.P.

(57) ABSTRACT

An electrical power supply including an asynchronous machine, an arrangement for driving a rotor of the asynchronous machine in rotation by a rotor of an engine, and an electrical connection for powering electrical equipment by the rotor of the asynchronous machine. The asynchronous machine is configured to receive AC electrical power via a stator of the asynchronous machine, and it presents, over a predetermined range of drive speeds of the rotor of the (Continued)

asynchronous machine under drive by the rotor of the engine, efficiency in transferring electrical power from the stator to the rotor that is privileged relative to the efficiency with which rotary mechanical power is converted into electrical power.

14 Claims, 4 Drawing Sheets

(51) Int. Cl.
  *F01D 25/02*  (2006.01)
  *F01D 7/00*  (2006.01)
  *H02K 11/00*  (2016.01)
  *H02K 16/02*  (2006.01)
  *H02K 17/42*  (2006.01)
  *B64D 15/12*  (2006.01)
  *H01F 38/18*  (2006.01)

(52) U.S. Cl.
  CPC ......... *F01D 25/02* (2013.01); *H02K 11/0094* (2013.01); *H02K 16/02* (2013.01); *H02K 17/42* (2013.01); *B64D 2221/00* (2013.01); *H01F 38/18* (2013.01)

(56) References Cited

U.S. PATENT DOCUMENTS

| | | | |
|---|---|---|---|
| 6,032,546 A * | 3/2000 | Stone | G01C 19/10 307/104 |
| 7,432,622 B2 | 10/2008 | Griepentrog et al. | |
| 2004/0155537 A1 * | 8/2004 | Nakano | F03D 9/25 310/51 |
| 2006/0087123 A1 * | 4/2006 | Stout | F02C 7/268 290/2 |
| 2006/0267523 A1 * | 11/2006 | Seelig | H02J 5/005 318/16 |
| 2008/0067984 A1 * | 3/2008 | Anghel | F01D 15/10 322/52 |
| 2010/0013343 A1 * | 1/2010 | Bi | H02K 7/09 310/198 |
| 2011/0031840 A1 * | 2/2011 | Huth | H02K 11/0094 310/195 |
| 2011/0050377 A1 | 3/2011 | Bjerknes et al. | |
| 2011/0290942 A1 | 12/2011 | Imbert et al. | |
| 2012/0133142 A1 * | 5/2012 | Langel | F03D 80/50 290/55 |
| 2012/0133468 A1 * | 5/2012 | Bedini | H01F 38/18 336/120 |
| 2013/0200623 A1 * | 8/2013 | Powell | H02K 7/1823 290/52 |
| 2014/0035402 A1 * | 2/2014 | Bertotto | H02K 1/27 310/46 |
| 2014/0291987 A1 * | 10/2014 | Dooley | F02C 7/275 290/34 |

FOREIGN PATENT DOCUMENTS

| | | |
|---|---|---|
| WO | 2009 128724 | 10/2009 |
| WO | 2011 000937 | 1/2011 |

* cited by examiner

ELECTRICAL POWER SUPPLY SYSTEM COMPRISING AN ASYNCHRONOUS MACHINE, AND AN ENGINE FITTED WITH SUCH AN ELECTRICAL POWER SUPPLY SYSTEM

TECHNICAL FIELD AND PRIOR ART

The invention relates to an electrical power supply system, in particular for powering electrical equipment carried by a rotating support. The invention also relates to an engine fitted with such a power supply system.

The invention serves in particular to provide means for electrically powering equipment carried by the blades of a rotor of an engine, or the blades of two rotors rotating in opposite directions of an engine, such as deicing equipment for the blades or systems for electrically positioning such blades.

Electrical power supply systems for such devices are known that transmit electricity from the stationary portions of an airplane or of the engine with the help of brush devices, e.g. as described in Document U.S. Pat. No. 4,621,978. Nevertheless, those devices are heavy, not very reliable, and require regular maintenance together with a system for cooling them in operation. Problems are also found involving compatibility with the oily substances present in their environment.

Rotary transformers are also known that also serve to transmit electricity from the stationary portions of the airplane or the engine. There exist such transformers operating at low frequency (less than 1 kilohertz (kHz)) that possess an architecture of U-shaped or E-shaped type, with topologies seeking to solve the problem of laminating materials. In contrast, in high frequency ranges (greater than 1 kHz), at high power (greater than 5 kilowatts (kW)), laminated materials lose their properties when the temperature rises (typically above 200° C.). This gives rise to high levels of losses and to transformers that are sensitive to vibration and to impacts. An example of a document describing a rotary transformer in the specified context is WO 2010/081654.

Also known is Document FR 2 962 271, which teaches delivering electricity to a rotating support by using an asynchronous machine operating as a self-excited generator.

The invention seeks to solve the above-mentioned problems and to provide a solution that is reliable, that needs little maintenance, that is light in weight, and that occupies limited space.

SUMMARY OF THE INVENTION

For this purpose, there is provided an electrical power supply comprising an asynchronous machine, an arrangement for driving a rotor of the asynchronous machine in rotation by means of a rotor of an engine, and an electrical connection for powering electrical equipment by means of said rotor of the asynchronous machine, the system being characterized in that the asynchronous machine is also arranged to receive alternating current (AC) electrical power via a stator of said asynchronous machine, and it presents, over a predetermined range of drive speeds of the rotor of the asynchronous machine under drive by said rotor of the engine, efficiency in transferring electrical power from said stator to said rotor that is privileged relative to the efficiency with which rotary mechanical power is converted into electrical power.

By making this design choice, an asynchronous machine can be put into place for powering electrical equipment via its rotor, which machine is of weight and volume that are considerably smaller than the weight and volume of an asynchronous generator of the kind described in the prior art. The advantage of using an asynchronous machine compared with using a U-core or an E-core type rotary transformer is conserved since there is no problem of laminating materials. Maintenance requirements are very low.

In a particular embodiment, the asynchronous machine has a progressive wave winding, at least in a rotor or in a stator. This serves to increase the reliability of the asynchronous transformer.

In a particular embodiment, the asynchronous machine has a winding with only one conductor bar per slot. The number of connections required is thus reduced, thereby making it possible to reduce the weight and the size of the device.

In another aspect, the invention also provides an engine having a rotor carrying electrical equipment, the rotor including at least one electrical power supply system as mentioned above, the electrical equipment being connected to the electrical connection of the power supply system. Such a motor presents improved performance because it makes use of a device that is lighter in weight, more compact, and more reliable for the purpose of electrically powering electrical equipment carried by the rotor of the engine.

In various possible arrangements, said stator of the asynchronous machine is arranged to receive AC electrical power from the engine via a generator, from an accessory gearbox (AGB) of the engine, or from an AC electrical power supply. In other possible arrangements that are different, said stator of the asynchronous machine is stationary relative to the nacelle of the engine, or stationary relative to a second rotor of the engine.

In a particular embodiment, the engine includes a second rotor carrying second electrical equipment, the engine having at least one second electrical power supply system as mentioned above, the second electrical equipment being connected to the electrical connection of the second power supply system, the two electrical power supply systems being arranged in parallel to receive AC electrical power from a common source via respective stators. An unducted fan having two contrarotating rotors can thus be equipped in this way.

In various possible arrangements, a connection between the electrical equipment and the electrical connection to the power supply system passes via a mechanical power gearbox, or via a rotary transformer, or via a generator, or via a second rotor of the engine that rotates in the opposite direction to the first rotor.

The electrical equipment may in particular comprise a device for deicing a blade or a system for electrically positioning a blade.

BRIEF DESCRIPTION OF THE FIGURES

The invention is described below with reference to the following accompanying figures.

DETAILED DESCRIPTION OF THE INVENTION

Figure 1:
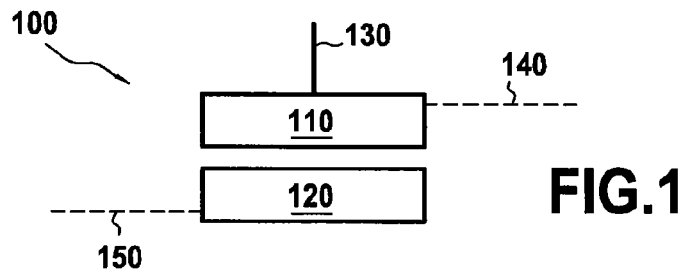
FIG. 1 shows a generalized embodiment of an electrical power supply system of the invention.

FIG. 1 shows an electrical power supply system in a generalized embodiment of the invention. It comprises a machine 100 made up of a rotor 110 and a stator 120. The rotor 110 is connected to a mechanical arrangement 130 to enable it to be driven by a rotor of an engine. The rotor coils are connected to an electrical connection 140 for electrically powering electrical equipment. The stator coils are connected to an electrical connection 150 for applying electrical power, in particular alternating electrical power. For the rotor of the asynchronous machine being driven over a predetermined range of drive speeds by the rotor of the engine, the asynchronous machine 100 presents efficiency in the transfer of electrical power from the stator 120 to the rotor 110 that is privileged relative to the efficiency with which rotary mechanical power is converted into electrical power. This is obtained by design: the transformer effect is optimized for a range of speeds of rotation, to the detriment of the torque taken off.

By way of example, the rotor 110 may be provided with balanced three-phase winding. For this purpose, the machine possesses the same number of pairs of poles on the stator and on the rotor, or it possesses a winding that is capable of adapting to balanced three-phase electricity.

For example, one possible design for the system of FIG. 1 makes use of six pairs of poles with an airgap of 1 millimeter (mm). A voltage of 120 volts (V) root mean square (rms) is applied to the stator (relative to neutral) at 600 hertz (Hz) for a supplied electrical power of 24.7 kW while the rotor of the asynchronous machine is driven at 15 Hz. The voltage obtained from the rotor then has a frequency of 690 Hz, an amplitude of 108 V rms (relative to neutral) and a delivered power of 24 kW. It can be seen that a mechanical power of 3.3 kW is taken from the rotor and that the machine leads to only 4 kW of losses, essentially associated with the transformer function.

The predetermined range of speeds for the rotor of the asynchronous machine being driven by the rotor of the engine over which efficiency in the transfer of electrical power from the stator 120 to the rotor 110 is privileged relative to the efficiency with which rotary mechanical power is converted into electrical power is arranged around a rotation frequency of 15 Hz, e.g. the range of 10 Hz to 20 Hz, or the range of 14 Hz to 16 Hz. In the example shown, the optimization effect is revealed by the low value of losses (4 kW) combined with 3.3 kW of power being taken off from the power delivered by the engine, which power is far from being optimized since power takeoff has specifically been neglected in order to optimize the transformer effect. The power delivered to the electrical connection 140 is regulated by adjusting the power applied by the electrical connection 150. Under certain conditions, the power required at the stator may be less than the output power from the rotor, because of the power delivered by the engine. The load may be observed via the asynchronous machine in order to determine its operating state.

Power may be transmitted with a rotor that is stationary, in which case operation is solely of transformer type.

It is specified that the asynchronous machine may have topology of the type involving radial or axial flux variation.

Figure 2:
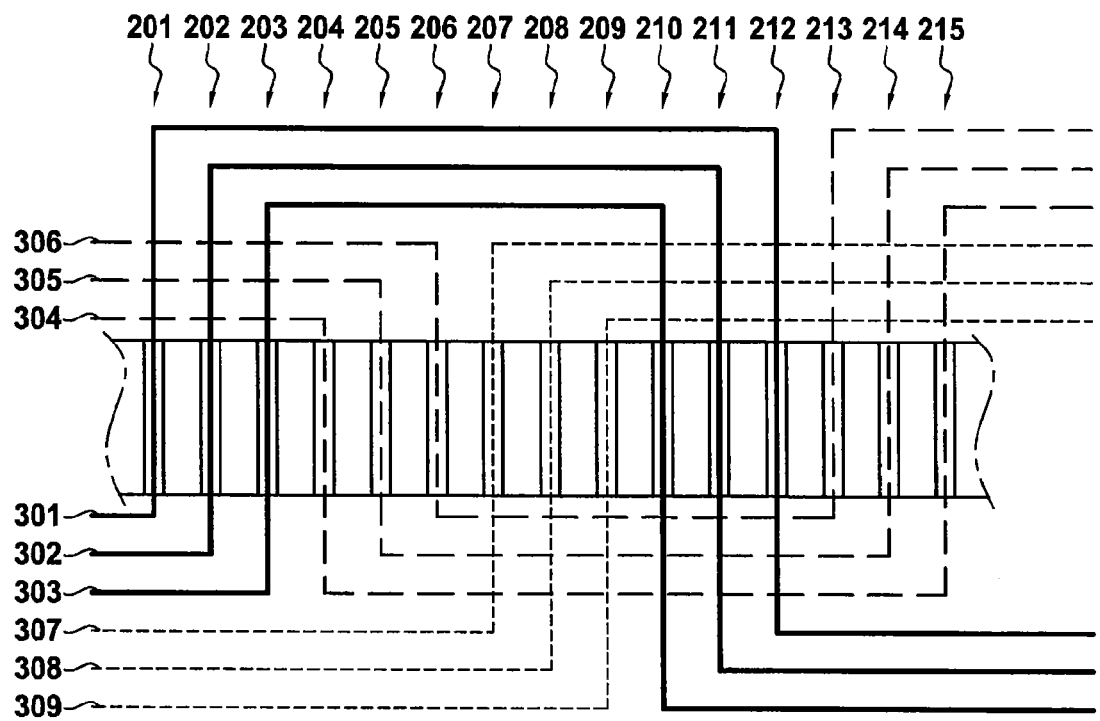
FIG. 2 shows a particular aspect of the FIG. 1 embodiment.

FIG. 2 shows an embodiment of the winding of a rotor or a stator of the machine 100 shown in FIG. 1.

The same type of winding may be used both on the stator and on the rotor, however it is also possible to use different windings on the rotor and on the stator. The winding is a progressive wave winding which makes it possible to use only one conductor bar per rotor or stator slot, thereby reducing the risks of inter-bar short circuits.

In FIG. 2, 14 slots are shown that are numbered 201 to 214, and the winding has nine conductors, numbered 301 to 309. In the embodiment shown, each pole has three conductor bars connected in parallel to the same phase of the three-phase voltage.

Thus, conductor portions 301, 302, and 303 are inserted in successive slots 201, 202, and 203 forming a first pole. At the outlet from the respective slots, all three of the conductors 301, 302, and 303 are bent at right angles in the same direction and are passed via slots 212, 211, and 210 respectively (i.e. along the periphery of the rotor or the stator, the first conductor to leave its slot is subsequently the last to enter into another slot).

The conductor portions between the slots constitute conductor overhangs representing wasted volume and weight, and using a progressive wave winding makes it possible to reduce their lengths. The conductors 304, 305, and 306 connected in parallel to a second phase of the three-phase AC voltage occupy respective slots 204, 205, and 206, and after being bent through a right angle and occupying overhang type sections, they return to respective slots not shown and referenced 214 and 213 in the figure (once more the first conductor to leave its slot is subsequently the last to enter into the next slot). The figure also shows conductors 307, 308, and 309 that occupy the slots 207, 208, and 209 and that are connected in parallel to the third phase of the three-phase voltage. The overhangs of the conductors 301, 302, and 303 between the slots 201, 202, 203 and 210, 211, 212 are arranged in this embodiment at a distance from the slots, while the overhangs of the conductors 304, 305, and 306 between the slots 204, 205, 206 and 213, 214 are located close to the slots.

Figure 3:
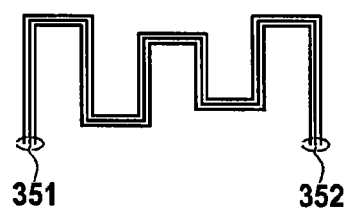
FIG. 3 is another view of the particular aspect of FIG. 2.

FIG. 3 shows the conductors of one phase in an end-to-end view for a variant of the FIG. 2 embodiment. The conductors are connected to the external electrical circuit at their ends 351 and 352. This figure shows the overhangs at two distances from the slots in the following sequence: near overhang, far overhang, near overhang, near overhang, far overhang. With this arrangement, once again, the first conductor to leave its slot is subsequently the last to enter into another slot.

Figure 4:
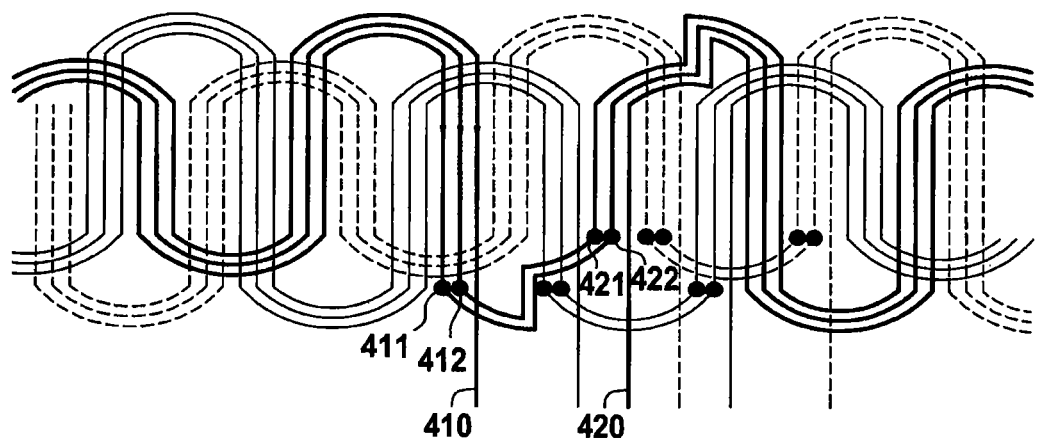
FIG. 4 is another view of the particular aspect of FIGS. 2 and 3.

FIG. 4 shows the conductors of the three phases in a variant of FIGS. 2 and 3. In this example there are three conductor bars per pole, as in the preceding figures. A single conductor is used for each phase. It follows three complete turns around the periphery of the rotor or the stator between its two free ends, and it is connected to the ground of the rotor or of the stator at four points, two of which are close to the first free end and two of which are close to the second free end.

References 410 and 420 are used to show the free ends of one of the three conductors. The same connection scheme is used for the two other connectors. On approaching one of the two free ends that has the reference 410, the conductor crosses two portions of the same conductor making complete turns around the periphery prior to following them in parallel manner, whereas on approaching a second one of the two ends, referenced 420, the conductor follows the two portions of the same conductor following complete turns of the periphery in parallel manner without crossing them. The connections close to the free end with crossing are referenced 411 and 412 and the connections close to the free end without crossing are referenced 421 and 422.

Figure 5:
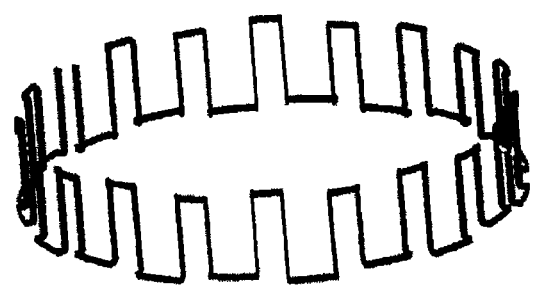
FIG. 5 is another view of the particular aspect of FIGS. 2 to 4.

FIG. 5 shows the conductor of one phase from end to end, and it is specified that if there are n conductor bars per pole, then FIG. 5 shows only the number of conductor turns divided by n, for only one of the three phases.

Figure 6:
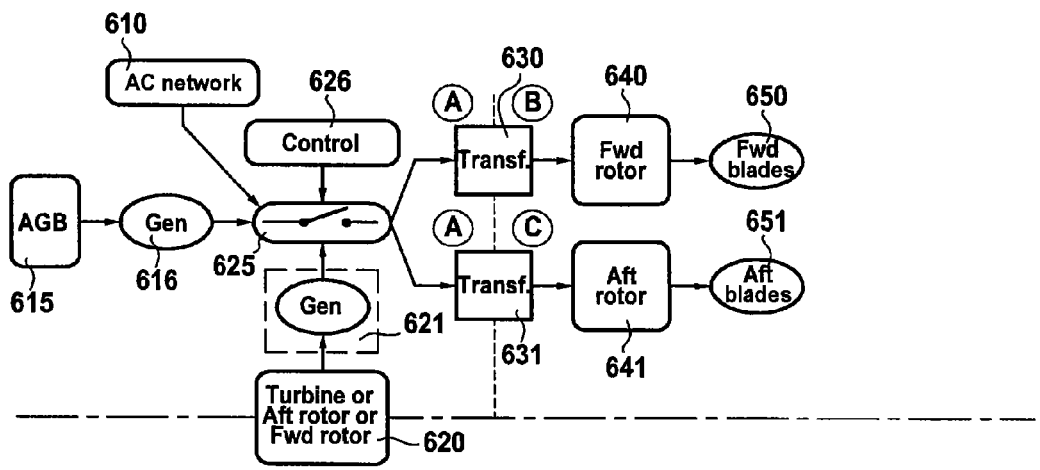
FIG. 6 shows an embodiment of an engine of the invention.

FIG. 6 shows a possible implementation of the invention on an engine having two contrarotating rotors, such as unducted fans, for example.

AC electricity is obtained either from the electricity network 610 of the aircraft, or from the AGB 615, or from the engine 620 (free turbine, first rotor or aft (Aft) rotor, or second rotor or forward (Fwd) rotor. When using the AGB or a rotor, a respective generator 616 or 621 is used. A switch 625 under the control of a control system 626 makes it possible optionally to select the electricity source. If necessary, it includes a power converter for formatting the power for feeding to the asynchronous machine. The electrical power is transferred from the stationary reference frame A to the two contrarotating rotary reference frames B and C by two transformers 630 and 631 connected in parallel with each other at the outlet from the switch 625. The reference frames B and C are the two rotors Fwd 640 and Aft 641, respectively. The electrical power is finally taken to the devices that are for powering on the blades of these rotors, given respective references 650 and 651.

The transformers 630 and 631 are electrical power supply systems as described with reference to FIGS. 1 to 5.

Figure 7:
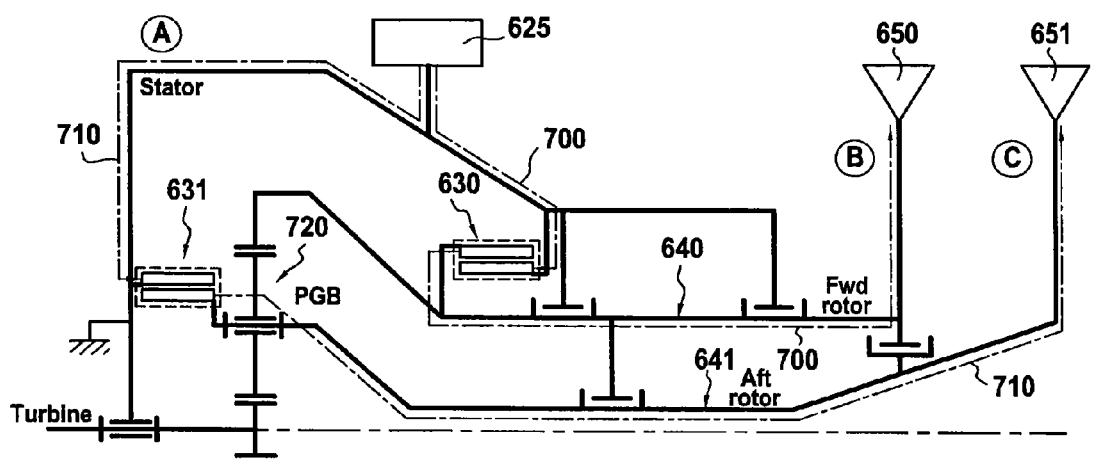
FIG. 7 shows certain implementation aspects of the FIG. 6 embodiment.

A variant of the embodiment of FIG. 6 is shown in FIG. 7 which shows other embodiment details. AC electrical power (reference 625) is taken to the stator of the engine (reference frame A) by two conductive lines 700 and 710, the first of which includes the transformer 630 and continues as far as the blades 650 of the rotor 640, and the second of which includes the transformer 610 and continues through the power gearbox (PGB) mechanism 720 prior to reaching the blades 651 of the rotor 641. Various bearings are shown in the figure to indicate the relative rotations between the various elements.

Figure 8:
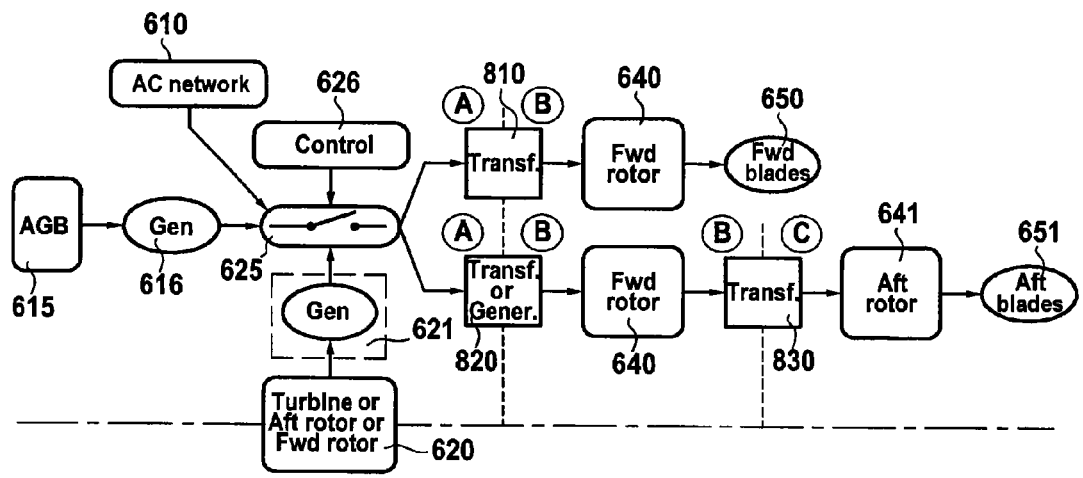
FIG. 8 shows another embodiment of an engine of the invention.

FIG. 8 shows another possible embodiment of the invention also on an engine having two contrarotating rotors. AC is obtained as above either from the electricity network 610 of the airplane, or from the AGB 615, or from the engine 620.

Electrical power is initially transferred from the stationary reference frame A to the rotary reference frame B in parallel by a transformer 810, and by a transformer 820, which may also be a generator 820. The reference frame B is the reference frame of the rotor Fwd 640. The blades 650 of the rotor 640 are powered by the transformer 810. A transformer 830 transfers the power delivered by the transformer or by the generator 820 from the reference frame B to the reference frame C. The reference frame C is the reference frame of the rotor Aft 641. The blades 651 of the rotor 641 are powered by the transformer 830. The transformers 830 and 810, and optionally the transformer 820, are electrical power supply systems as described with reference to FIGS. 1 to 5.

This series connection serves to mitigate certain integration constraints.

Figure 9:
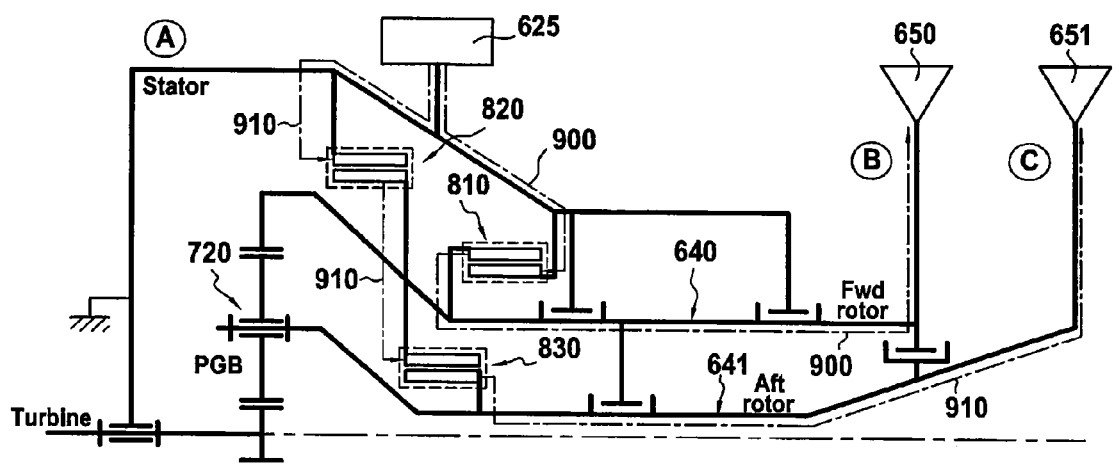
FIG. 9 shows certain implementation aspects of the FIG. 8 embodiment.

A variant of the FIG. 8 embodiment is shown in FIG. 9 with other embodiment details. The AC power (referenced 625) is taken to the stator of the engine (reference frame A) by conductive lines 900 and 910, the first of which includes the transformer 810 and continues to the blades 650 of the rotor 640, while the second of which includes the transformer or generator 910 and the transformer 830, and continues to the blades 651 of the rotor 641. Various bearings are shown in the figure to indicate relative rotation between the various elements.

In this variant, the power supply lines avoid the PGB mechanism.

The invention is described above with reference to embodiments that are not limiting, and it extends to any variant within the ambit of the scope of the claims.

The invention claimed is:

1. An electrical power supply comprising:
    an asynchronous machine having a stator and a rotor and configured to transfer energy from the stator to the rotor at a first efficiency;
    an arrangement for driving the rotor of the asynchronous machine in rotation by a rotor of an engine;
    an electrical connection for powering electrical equipment from a winding of the rotor of the asynchronous machine, the transfer of energy from the winding of the rotor of the asynchronous machine to the electrical equipment having a second efficiency; and
    a controller that regulates the power delivered to the electrical equipment by controlling an amount of AC electrical power provided to a winding of the stator of the asynchronous machine based on a drive speed of the rotor of the asynchronous machine and at least one of the first efficiency and the second efficiency, and
    when the drive speed of the rotor of the asynchronous machine falls within a predetermined range of drive speeds, the controller controls the amount of AC electrical power provided to the winding of the stator of the asynchronous machine to maximize the first efficiency in transferring electrical power from the stator to the rotor without considering the second efficiency with which power is transferred from the winding of the rotor of the asynchronous machine to the electrical equipment.

2. A power supply system according to claim 1, wherein the asynchronous machine includes a progressive wave winding at least in the rotor or in the stator.

3. A power supply system according to claim 1, wherein the asynchronous machine includes a winding with only one conductor bar per slot.

4. An engine comprising a rotor carrying electrical equipment, the rotor including at least one electrical power supply system according to claim 1, the electrical equipment being connected to the electrical connection of the power supply system.

5. An engine according to claim 4, wherein the stator of the asynchronous machine is configured to receive AC electrical power from the engine via a generator.

6. An engine according to claim 4, wherein the stator of the asynchronous machine is configured to receive AC electrical power from a generator coupled to an accessory gearbox of the engine.

7. An engine according to claim 4, wherein the stator of the asynchronous machine is configured to receive AC electrical power from an AC power supply network.

8. An engine according to claim 4, wherein the stator of the asynchronous machine is stationary relative to a nacelle of the engine.

9. An engine according to claim 4, wherein the stator of the asynchronous machine is stationary relative to a rotor of the engine.

10. An engine according to claim 4, comprising a second rotor carrying second electrical equipment, the engine comprising at least one second electrical power supply system, the second electrical equipment being connected to an electrical connection of the second power supply system, the first and second electrical power supply systems being arranged in parallel to receive AC electrical power from a common source via respective stators.

11. An engine according to claim 4, wherein a connection between the electrical equipment and the electrical connection of the power supply system passes via a rotary transformer.

12. An engine according to claim 4, wherein the engine includes a second rotor that rotates in the opposite direction of the rotor of the engine, and the stator of the asynchronous machine is stationary relative to the second rotor of the engine.

13. An engine according to claim 4, wherein the electrical equipment comprises a device for deicing a blade.

14. An engine according to claim 4, wherein the electrical equipment comprises a system for electrically positioning a blade.

* * * * *